US009411794B2

(12) United States Patent
Shima (10) Patent No.: US 9,411,794 B2
(45) Date of Patent: Aug. 9, 2016

(54) FACILITATING SELECTION OF OBJECTS ON DISPLAY SCREENS

(75) Inventor: Kotaro Shima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 2261 days.

(21) Appl. No.: 12/206,772

(22) Filed: Sep. 9, 2008

(65) Prior Publication Data

US 2009/0077498 A1    Mar. 19, 2009

(30) Foreign Application Priority Data

Sep. 14, 2007    (JP) .................................. 2007-238668

(51) Int. Cl.
  *G06F 3/048* (2013.01)
  *G06F 17/24* (2006.01)
  *G06F 3/0483* (2013.01)
  *G06F 17/22* (2006.01)

(52) U.S. Cl.
  CPC .............. *G06F 17/24* (2013.01); *G06F 3/0483* (2013.01); *G06F 17/2247* (2013.01)

(58) Field of Classification Search
  USPC ......................................... 715/790, 794, 797
  See application file for complete search history.

(56) References Cited

U.S. PATENT DOCUMENTS

| | | | | | |
|---|---|---|---|---|---|
| 5,459,831 | A | * | 10/1995 | Brewer et al. | 715/853 |
| 5,548,703 | A | * | 8/1996 | Berry et al. | 715/853 |
| 6,018,333 | A | * | 1/2000 | Denber | 715/790 |
| 6,124,861 | A | * | 9/2000 | Lebovitz et al. | 715/808 |
| 6,133,914 | A | * | 10/2000 | Rogers et al. | 345/661 |
| 6,404,443 | B1 | | 6/2002 | Westerman | |
| 7,000,197 | B1 | * | 2/2006 | Bou et al. | 715/812 |
| 7,420,556 | B2 | * | 9/2008 | Fujiki | 345/427 |
| 2002/0175947 | A1 | | 11/2002 | Conrad et al. | |
| 2005/0149879 | A1 | | 7/2005 | Jobs et al. | |
| 2005/0204029 | A1 | * | 9/2005 | Connolly et al. | 709/223 |
| 2006/0161847 | A1 | | 7/2006 | Holecek et al. | |
| 2006/0224989 | A1 | | 10/2006 | Pettiross et al. | |

FOREIGN PATENT DOCUMENTS

| | | | |
|---|---|---|---|
| EP | 0738952 | A2 | 10/1996 |
| JP | 9259168 | A | 10/1997 |
| JP | 2000066794 | A | 3/2000 |
| JP | 2001331482 | A | 11/2001 |
| JP | PUPA2002366974 | | 12/2002 |
| JP | 2004295577 | | 10/2004 |
| JP | 2004295577 | A * | 10/2004 ................ G06F 3/00 |

(Continued)

OTHER PUBLICATIONS

"Method for selecting a plurality of objects at the same time in Web Art Designer" (http://www-06.ibm.com/ip/domino01/swhc/esupport.nsf/all/hpbo0720).

(Continued)

*Primary Examiner* — Matthew Ell
(74) *Attorney, Agent, or Firm* — Winstead, P.C.

(57) ABSTRACT

A method for facilitating selection of an object on the display screen, an apparatus for implementing the method, and a program for causing a computer to function as the apparatus are provided. The method includes the steps of selecting a specific object on the display screen in response to a user input, extracting any of a plurality of objects displayed on the display screen that overlaps the selected specific object as a selection candidate by following a tree structure of the objects, and displaying a selection switching view including an element representing the selection candidate in the vicinity of the selected specific object.

5 Claims, 7 Drawing Sheets

(56) References Cited

FOREIGN PATENT DOCUMENTS

| JP | 2006145330 | A | 6/2006 |
|---|---|---|---|
| JP | 2007067662 | A | 3/2007 |
| JP | 9200767662 | | 3/2007 |
| JP | 2008066575 | | 3/2008 |
| TW | M312728 | | 5/2007 |

OTHER PUBLICATIONS

"Summary of Layer Palette" (http://help.adobe.com/ja_JP/Photoshop/10.0help.html?content=WSfd1234e1c4b69f30ea53e41001031ab64-78e1.html.

European Search Report for European Application No. 08830160.1 dated Jul. 13, 2013.

Examination Report for European Patent Application No. 08 830 160.1 dated Jul. 31, 2014, pp. 1-6.

Office Action for European Patent Application No. 08 830 160.1 from European Patent Office dated Oct. 31, 2014, pp. 1-5.

Office Action from Canadian Intellectual Property Office for Canadian Patent Application No. 2,699,242 dated Mar. 19, 2015, pp. 1-4.

Examination Report for European Application No. 08830160.1 dated Feb. 12, 2014, pp. 1-5.

\* cited by examiner

SELECTION SWITCHING VIEW
30

| TAB NUMBER | OBJECT ID |
|---|---|
| 0 | LI1 |
| 1 | UL |
| 2 | TABLE |
| 3 | TR2 |
| 4 | TD4 |
| . | . |
| . | . |
| . | . |

FACILITATING SELECTION OF OBJECTS ON DISPLAY SCREENS

FIELD OF THE INVENTION

The present invention relates to selection of an object, and more particularly to a method, apparatus and program for readily selecting a desired object on a display screen.

BACKGROUND

In the use of word processors, WYSIWYG-type HTML editors, graphic tools or other tools, it is necessary to "select" an object to perform editing operations such as copying, cutting, pasting, or deleting of an object or changing of the attribute values thereof. One of the simplest ways to do so is to use mouse clicks for selection. However, in the case of a Web page, for example, where many objects are arranged in an overlapped or nested manner, it is difficult to click on a target object due to a narrow area for clicking, resulting in repeated failure in clicking on the target object, and an alternative way, such as designation of a rectangular area, keyboard operation or the like, may be required. Therefore, there is a demand for a method enabling easy selection of a target object even in such a case where the objects are arranged in a complicated manner.

Some methods enabling selection of an object from among those complicatedly arranged on a display screen are known, which include an object stack in WebArt Designer included in IBM® Homepage Builder™ (Non-Patent Document 1), and a layer palette in Adobe® Photoshop® (Non-Patent Document 2). The object stack and the layer palette are each for displaying items corresponding to all the objects arranged on the display screen in a specific location (object stack or layer palette) in the form of a list for selection. In the list, the items are displayed to indicate the stacked order of the corresponding objects, and when a mouse is clicked on a specific item among them, the corresponding object is selected. In addition, there is known a technique where the object elements are displayed in the form of a tree, and when a mouse is clicked on an element on the tree, the corresponding object is selected on the editor.

While all the objects are listed for display in each of the conventional techniques described above, there is also known a technique where only the objects satisfying a prescribed condition are extracted for display in a list. See Japanese Unexamined Patent Publication (Kokai) No. 2002-366974. According to this known technique, the objects through which a straight line connecting the view point and the cursor position transmits are extracted as selection candidate objects and listed for display in a list dialog box. See also "Method for selecting a plurality of objects at the same time in WebArt Designer"

(http://www-06.ibm.com/jp/domino01/swhc/esupport.nsf/all/hpb0720) and
"Summary of Layer Palette"
(http://help.adobe.com/ja_JP/Photoshop/10.0/help.html?content=WSfd1234e1c4b69f30e
a53e41001031ab64-78e1.html.☐

With the method of listing and displaying all the objects, the location for displaying the list is fixed, and thus, if the location is far from a selected object, it would be necessary to move the mouse a relative long distance. Further, since all the objects are displayed on the list, if the number of objects increases, it may be troublesome to select a desired object.

With the method disclosed in Japanese Unexamined Patent Publication (Kokai) No. 2002-366974, although such trouble may be saved, the selection candidates are determined according to whether the straight line connecting the view point and the cursor position transmits through the objects, and thus, if a user wishes to designate a small object hidden behind a large object as a selection candidate, a plurality of clicking operations would be necessary.

SUMMARY

In view of the foregoing, an object of the present invention is to realize selection of an object which can solve the above-described problems.

According to the present invention, there is provided a method for facilitating selection of an object on a display screen of a computer, which includes: a step of selecting a specific object on the display screen in response to a user input; a step of extracting any of a plurality of objects displayed on the display screen that overlaps the selected specific object as a selection candidate by following a tree structure of the objects; and a step of displaying a selection switching view including an element representing the selection candidate in the vicinity of the selected specific object. Further, an apparatus for implementing the method, and a program for causing a computer to execute the method are also provided.

Preferably, in response to the user selecting a specific element included in the selection switching view, the object corresponding to the specific element is highlighted, and selection is switched to the object. This allows the user to perform an editing or other operation on the selected object.

While the selection switching view is preferably in the form of tabs from the standpoint of decreasing the display area, the view may be of any form, besides the tab form, as long as it can list and display the elements representing the selection candidates. For example, it may be displayed in the form of a tree.

If the number of elements included in the selection switching view increases too much, it would be difficult to list and display them, and thus, extraction of the selection candidates is preferably terminated at the time point when the number of the extracted selection candidates reaches a predetermined number.

A best mode for carrying out the present invention (hereinafter, simply referred to as an "embodiment") will now be described with reference to the drawings. It is needless to say that the embodiment will be described only by way of example and that the present invention is not restricted to the configuration of the embodiment.

DETAILED DESCRIPTION

Figure 1:
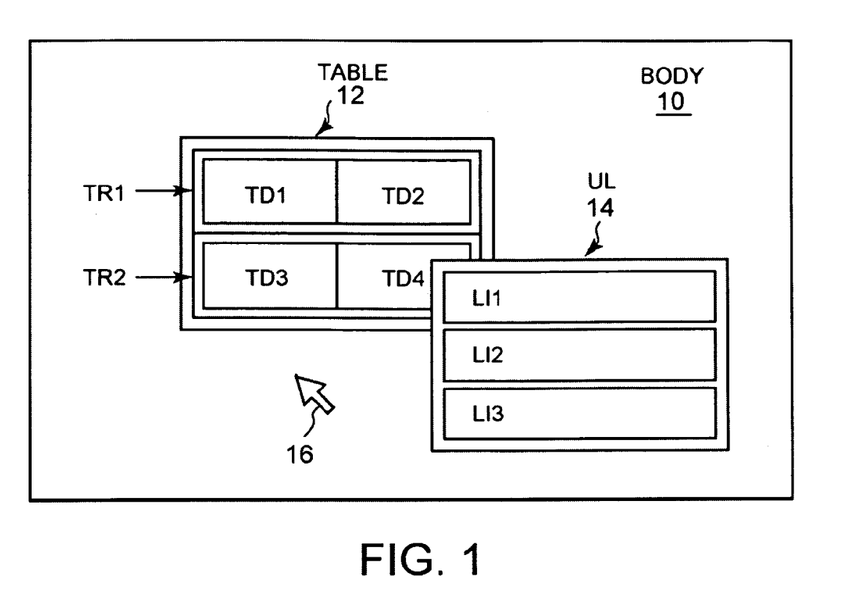
FIG. 1 shows an example of a display screen which is a target of the present invention.
Figure 2:
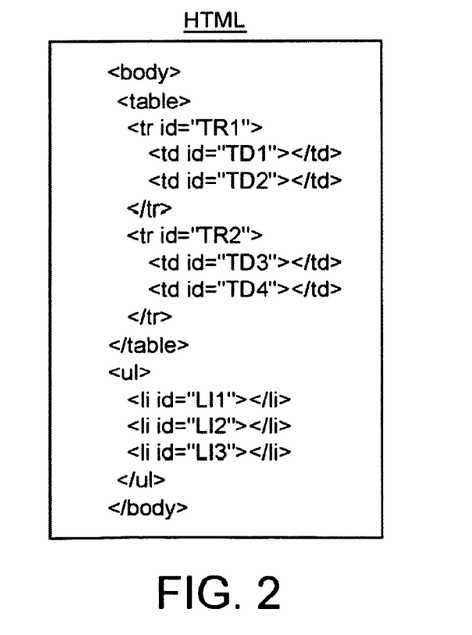
FIG. 2 shows HTML expression of the display screen shown in FIG. 2.

FIG. 1 shows an example of a display screen which is a target of the present invention. While FIG. 1 assumes a display screen of a Web page, the present invention is applicable not only to the Web pages but also to any display screen having a plurality of objects overlapping each other. The Web page shown in FIG. 1 has a tree structure as shown in FIG. 2. Although FIG. 2 shows the tree structure in HTML code, not limited thereto, the present invention can use tree structures of other forms.

In the example shown in FIG. 1, a body (BODY) 10 of the Web page is made up of a table (TABLE) 12 and an unordered list (UL) 14. The table 12 includes two rows TR1 and TR2, with the first row TR1 having two data cells TD1 and TD2, and the second row TR2 having two data cells TD3 and TD4. The unordered list 14 includes three list items LI1, LI2 and LI3. Here, the body 10, the table 12, the unordered list 14, the rows TR1 and TR2, the data cells TD1 through TD4, and the list items LI1 through LI3 are objects that can each be selected as an operation target.

To select an object, for example, a user may move a mouse cursor 16 to an object the user wishes to select and click thereon. However, in the case where the object to be selected is hidden beneath a larger object or a region to be clicked is small in size, it may be difficult for a person inexperienced with mouse operation to quickly select a desired object. Further, the user may click on the data cell TD or the row TR despite the intention to select the table 12, for example.

In the present invention, when a user moves the cursor 16 to a specific object on a display screen and clicks thereon, a tree structure as shown in FIG. 2 is followed to extract any objects overlapping the selected specific object as selection candidates, and a selection switching view including elements representing the respective selection candidates is displayed in the vicinity of the specific object to thereby facilitate selection of the object. As will be described later in detail, according to the present invention, the selection candidates are extracted by detecting overlapping of the objects, where the specific object selected in response to a user input is also extracted as a selection candidate because it is determined to overlap itself.

Figure 3:
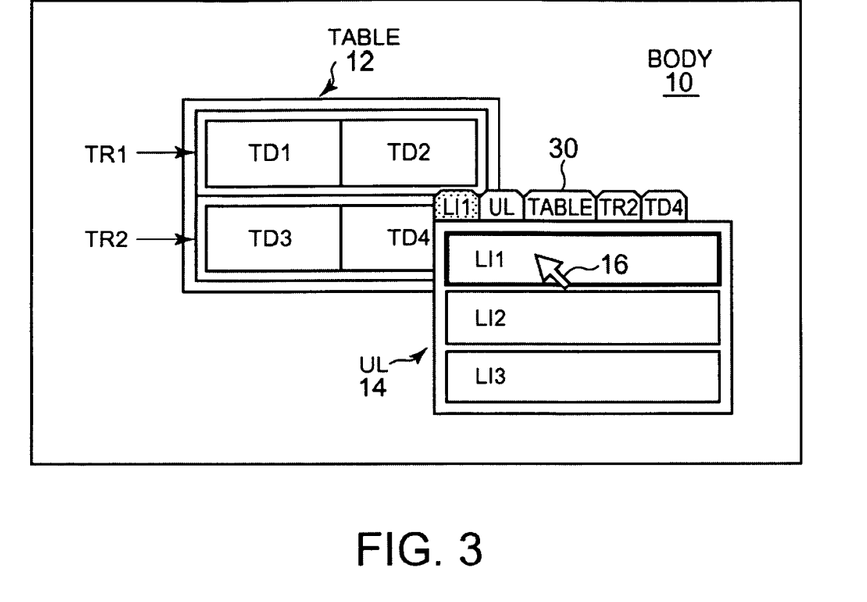
FIG. 3 shows an example of object selection according to the present invention.

FIG. 3 shows an example of object selection according to the present invention. Specifically, FIG. 3 shows the state where a user has moved the cursor 16 onto the list item LI1 and clicked thereon. According to the present invention, in response to the user clicking on a specific object, which is the list item LI1 for example, a selection switching view 30 is displayed near the object. The selection switching view 30 includes one or more tabs, each having displayed thereon an element representing a corresponding selection candidate (in this example, an object name is used, although it may be any identifier that can identify the selection candidate). In the example shown in FIG. 3, the selection switching view 30 includes five tabs, which have displayed thereon the respective names of the five objects overlapping the list item LI1 selected by clicking, i.e., the list item LI1 itself, the unordered list 14, the table 12, the row TR2, and the data cell TD4.

While the selection switching view 30 in the example in FIG. 3 adopts the tab form since it occupies small area within the display screen, the view may be in the form of a layer palette or a tree if it is unnecessary to take space into consideration.

Figure 4:
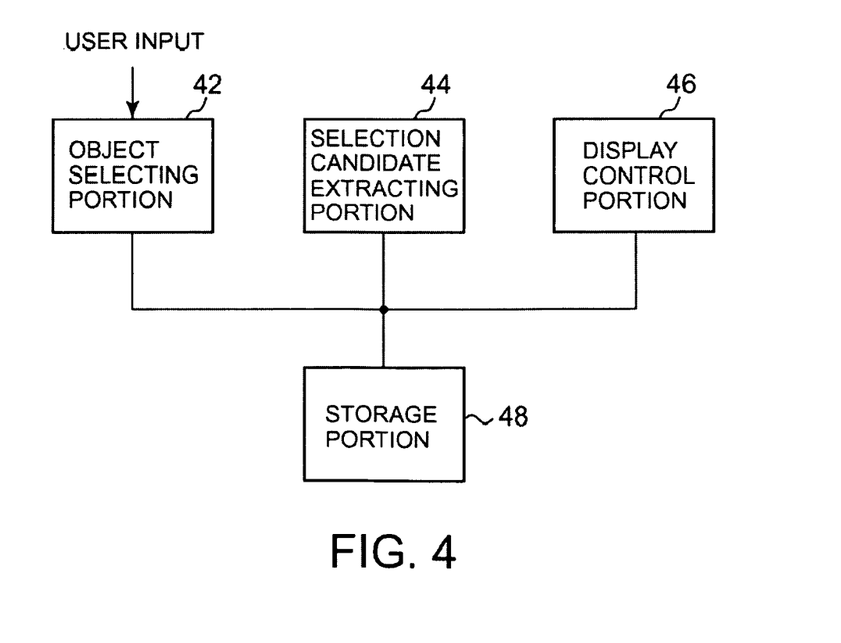
FIG. 4 is a block diagram showing an example of the functional configuration of an apparatus for generating a selection switching view for facilitating the object selection according to the present invention.

FIG. 4 shows an example of the functional configuration of an apparatus for generating the selection switching view 30 for facilitating selection of an object on a display screen. The selection switching view generating apparatus 40 shown in FIG. 4 includes: an object selecting portion 42 configured to select a specific object on a display screen in response to a user input; a selection candidate extracting portion 44 configured to extract, from among a plurality of objects displayed on the display screen, any object overlapping the selected specific object (hereinafter, referred to as the "selected object") as a selection candidate; a display control portion 46 configured to display a selection switching view including elements representing the selection candidates near the selected object; and a storage portion 48. The storage portion 48 stores information about the plurality of objects displayed on the screen, which may include, e.g., attribute information indicating an identifier, coordinates and a display priority for each object, and further stores structural information indicating the tree structure of the objects (which may be in HTML code as shown in FIG. 2).

When a user clicks the left button of a mouse (not shown), for example, the object selecting portion 42 selects the object including the clicked position therein. Such selection is possible by comparing the coordinates of the clicked position included in the user input with the coordinate information of the respective objects stored in the storage portion 48. When there are two or more objects including the clicked position therein, the object located at the forefront among those overlapping each other is selected.

Figure 5:
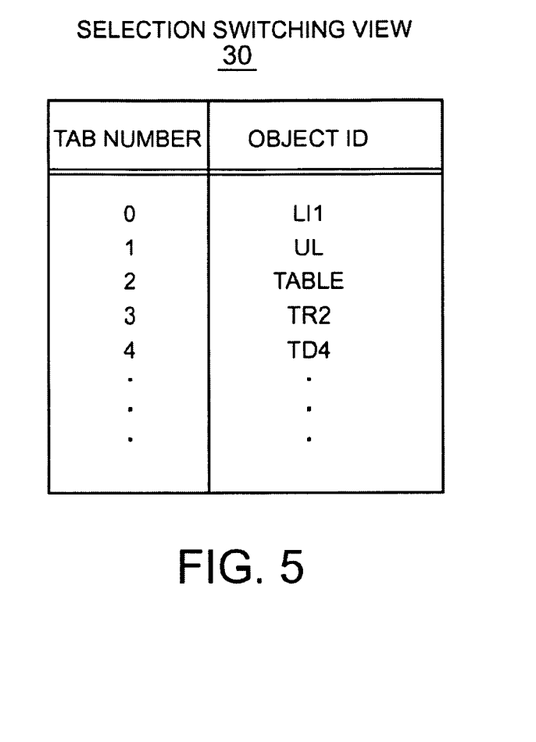
FIG. 5 shows an example of storage of the selection switching view generated by the apparatus shown in FIG. 4.

The selection candidate extracting portion 44 extracts the object selected by the object selecting portion 42 as well as any object having a specific relationship with the selected object, i.e., any object overlapping the selected object, as the selection candidates. Such overlapping of the objects may be detected by comparing the coordinates of the related objects. The selection candidate extracting portion 44 uses the identifiers of the objects extracted as the selection candidates to generate a selection switching view in the form of a table, as shown in FIG. 5 for example, and stores the view in the storage portion 48. The selection switching view shown in FIG. 5 corresponds to the selection switching view 30 shown in FIG. 3, and includes columns of tab numbers and object IDs. The tab numbers indicate the numbers of the tabs in the selection switching view 30 shown in FIG. 3 sequentially from the left, while the object IDs indicate the identifiers of the selection candidate objects corresponding to the respective tabs. If the identifiers are provided in the form of "id=" in HTML code as shown in FIG. 2 for example, they may be used as the object IDs. If such identifiers are not provided, the tag name may be used, and if there are two or more same tags in a page, the numerical value indicating a sequential number among the same tags may be inserted in [ ], for example, to be added to the end of the tag name. In this case, the object IDs in FIG. 5 may be expressed, from the top to the bottom, as LI[1], UL, TABLE, TR[2], and TD[4]. The detailed operation of extracting the selection candidates by the selection candidate extracting portion 44 will be explained later in conjunction with the flowcharts in FIGS. 6 and 7.

The display control portion 46 displays the selection switching view created by the selection candidate extracting portion 44 visually in the vicinity of the selected object, the view including the elements indicating the selection candidates (for example, the names of the selection candidates). In the example shown in FIG. 3, the selection switching view 30 is in the tab form, and when the user clicks on any of the tabs, the tab and the corresponding object are highlighted to indicate that the selection has been switched to that object. This allows the user to perform the editing operation or the like on the selected object.

Figure 6:
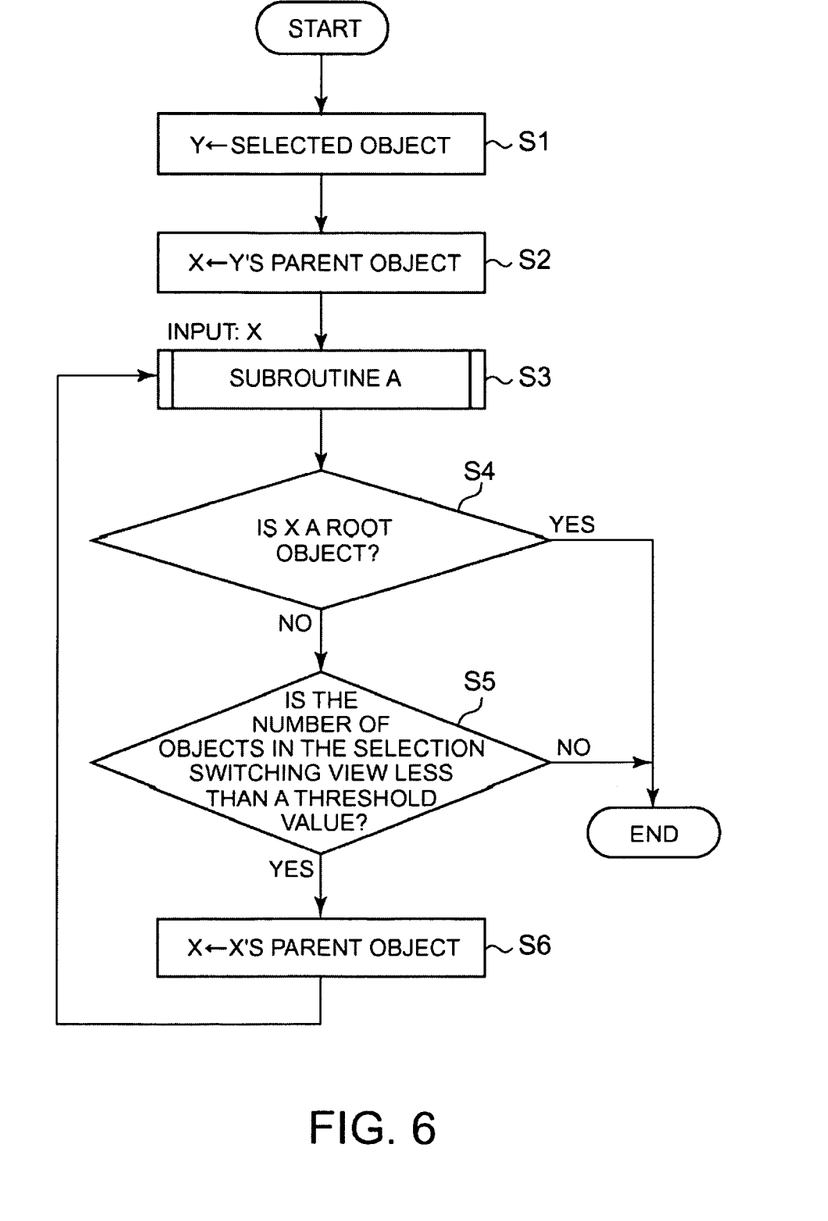
FIG. 6 is a flowchart illustrating a main flow of the operation of the apparatus shown in FIG. 4.

Next, an operation of the selection switching view generating apparatus 40 shown in FIG. 4 will be explained with reference to the flowcharts in FIGS. 6 and 7. FIG. 6 shows a main flow of the operation, and FIG. 7 shows a subroutine called from the main flow.

Firstly, in the first step S1 in FIG. 6, the object selecting portion 42 selects a specific object in response to a user input as described above and sets it as a parameter Y, and notifies the selection candidate extracting portion 44 of the parameter Y. Assuming here that the list item LI1 has been selected as shown in FIG. 3, the identifier "LI1" may be set as the parameter Y and notified to the selection candidate extracting portion 44.

Next, in step S2, the selection candidate extracting portion 44 searches for a parent object of the selected object Y (in the example in FIG. 3, the parent object is the unordered list (UL) 14), and sets its identifier as a parameter X. The parent object may be searched for by following the tree structure in HTML code as shown in FIG. 2, for example, upward from the element "LI1".

Figure 7:
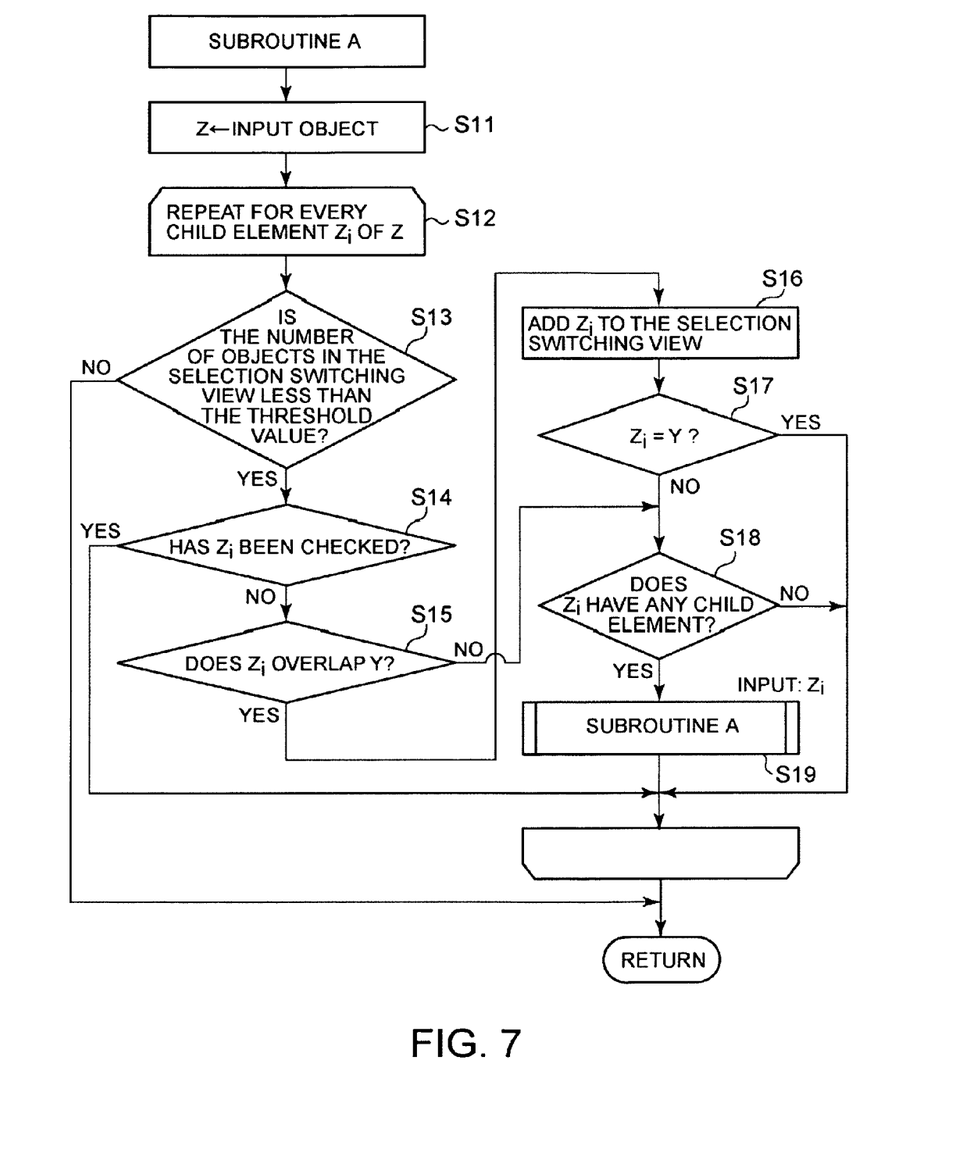
FIG. 7 is a flowchart illustrating a subroutine used in the main flow shown in FIG. 6.

Next, in step S3, the operation of the selection candidate extracting portion 44 moves to the subroutine A shown in FIG. 7, with X as the input. The subroutine A in FIG. 7 checks whether any of the descendent elements of the input object X overlaps the selected object Y, and if so, adds the element to the selection switching view.

In the first step S11 in the subroutine A, the selection candidate extracting portion 44 sets the input object as a parameter Z, and in the following step S12, repeats steps S13 through S19 as will be described below for each child element $Z_i$ (i=0, 1, 2, . . . ) of Z. The child element $Z_i$ is located, e.g., between <Z> and </Z> in the tree structure shown in FIG. 2. In the above example, Z=UL at the beginning, and thus, the list items LI1 through LI3 located between <UL> and </UL> are processed as the child elements in steps S13 through S19.

In the first step S13 in the repetitive loop, the selection candidate extracting portion 44 determines whether the number of objects included in the selection switching view is less than a threshold value. If the number of objects displayed on the selection switching view increases too much, it will be difficult to select one of them, and thus, the number of objects to be the selection candidates is preferably restricted to a prescribed number or less, for example five or less. If the number of objects included in the selection switching view has reached the threshold value, the process returns to the main flow in FIG. 6; otherwise, the process proceeds to the next step S14.

In step S14, the selection candidate extracting portion 44 determines whether the child element $Z_i$ was checked for the overlapping with the selected object Y during the previous call of the subroutine. If it has already been checked, the step S13 and the subsequent steps are repeated for the next child element $Z_{i+1}$; whereas if it has not been checked, the process proceeds to step S15 to determine whether the child element $Z_i$ overlaps the selected object Y. Such overlapping of the objects can be detected by comparing the coordinates of the objects stored in the storage portion 48, as described above. If $Z_i$ overlaps Y, the process proceeds to step S16; otherwise, the process proceeds to step S18.

In step S16, the selection candidate extracting portion 44 adds the child element $Z_i$ overlapping the selected object Y as a selection candidate to the selection switching view, and increments the number of objects included in the selection switching view by 1. To add a child element (object) to the selection switching view, the identifier of the child element may be written into the selection switching view 30 shown in FIG. 5, for example, as an object ID of the corresponding tab number. The number of objects included in the selection switching view may be tracked, for example, by initially setting an object counter (not shown) at zero and by counting up each time an object is added to the selection switching view.

In the next step S17, the selection candidate extracting portion 44 determines whether the child element $Z_i$ added to the selection switching view 30 corresponds to the selected object Y. Although step S17 is provided assuming that overlapping is not checked for the child element of the selected object Y, if such consideration is unnecessary, step S17 may be omitted. If $Z_i$=Y in step S17, the step S13 and the subsequent steps are repeated for the next child element $Z_{i+1}$; otherwise, the process proceeds to step S18, and it is determined whether the child element $Z_i$ has any child element. If so, the process proceeds to step S19, and the same subroutine A is performed for each child element of the child element $Z_i$. When all of the child elements $Z_i$ are checked, the process exits from the subroutine in FIG. 7 to return to the main flow in FIG. 6.

In step S4 in the main flow, the selection candidate extracting portion 44 determines whether the parent object X is a root object. If so, the main flow is terminated; otherwise, the process proceeds to step S5. In step S5, the selection candidate extracting portion 44 determines whether the number of objects included in the selection switching view is less than the threshold value. If not, i.e., if the number has reached the threshold value, the main flow is terminated. Otherwise, the process proceeds to step S6 to set the parent object of X as a new parent object X, and returns to step S3 to call the subroutine in FIG. 7.

Hereinafter, specific processing for the example in FIG. 3 according to the flowcharts in FIGS. 6 and 7 will be explained. For example, when the list item LI1 is selected by the user's mouse click operation, in step S1, its identifier "LI1" is set as the parameter Y. In the following step S2, the identifier "UL" of the unordered list 14, which is the parent object of the list item LI1, is set as the parameter X, and the subroutine in FIG. 7 is called in step S3 with X as the input.

In the first step S11 in the subroutine, the identifier "UL" of the unordered list, which is the input object, is set as the parameter Z, and in step S12 and the subsequent steps, all the child elements, i.e., the list items LI1 through LI3 are checked. In the first place, there is no object in the selection switching view, and none of the list items LI1 through LI3 has been checked, and thus, the process proceeds from step S13 through S14 to S15. As evident from FIG. 3, only the list item LI1 among the list items LI1 through LI3 overlaps the selected object Y (=LI1), and thus, in step S16, the list item LI1 alone is added to the selection switching view as a selection candidate, and the number of objects included in the selection switching view is incremented by 1. Subsequently, the process follows the YES path from step S17. For the remaining list items LI2 and LI3, the process follows the NO path from step S15 to reach step S18. As evident from FIG. 2, both of the list items LI2 and LI3 do not have any child element, and thus, the subroutine is not called in step S19.

When the list items LI1 through LI3 are all checked, the process returns to the main flow in FIG. 6. In the example shown in FIG. 3, the unordered list (UL) 14 is not a root object (NO in S4), and the number of objects in the selection switching view (currently 1) is less than the threshold value (for example, 5) (YES in S5), and thus, in step S6, the parent object of the unordered list (UL) 14 that was the parent object X is searched for by following the tree structure as in FIG. 2 for example, and as a result, the subroutine in FIG. 7 is called in step S3 with the body (BODY) 10 as a new parent object.

In this second call, the table (TABLE) 12 and the unordered list (UL) 14 being the child elements of the body (BODY) 10 are checked in steps S13 through S19. Although description here is made assuming that the parent object of the selected object Y is to be checked first, i.e., $Z_0$=UL and $Z_1$=TABLE, the order may be determined arbitrarily.

The number of objects in the selection switching view checked in step S13 is currently 1 (because only the list item LI1 is included as described above), and if the threshold value is 5 for example, the number of objects is less than the threshold value, and thus, the process proceeds from step S13 to step S14. In step S14, the first child element of BODY 14, i.e., UL 14, has not been checked yet, and therefore, the process proceeds to step S15 to check the overlapping with the selected object Y, i.e., the list item LI1. As evident from FIG. 3, UL 14 overlaps the list item LI1, and thus, the process proceeds to step S16, where UL is added to the selection switching view as a selection candidate, and the number of objects is incremented by 1 to be 2. In step S17, $Z_0$ is not Y, i.e., UL 14 differs from the list item LI1 which is the selected object, and thus, the process proceeds to step S18. In the example shown in FIG. 3, UL 14 has child elements which are list items LI1 through LI3, and thus, the process proceeds from step S18 to step S19, where the subroutine in FIG. 7 is called recursively with UL 14 as the input object. However, since the list items LI1 through LI3 being the child elements of UL 14 have been checked during the first call of the subroutine, the process follows the YES path from step S14 to terminate the recursive call, and the process proceeds to checking of $Z_1$ (=TABLE).

On the checking of TABLE 12, the number of objects in the selection switching view (currently 2) is still less than the threshold value (YES in S13), and TABLE 12 has not been checked yet (NO in S14), and further, TABLE 12 overlaps the list item LI1 being the selected object (YES in S15), and therefore, in step S16, TABLE 12 is added to the selection switching view as a selection candidate, and the number of objects is incremented by 1 to be 3. As in the case of UL 14, TABLE 12 differs from the list item LI1 being the selected object, and thus, the process proceeds from step S17 to step S18. In the example shown in FIG. 3, TABLE 12 has child elements which are rows TR1 and TR2, and thus, the process proceeds from step S18 to step S19, where the subroutine in FIG. 7 is called recursively with TABLE 12 as the input object.

In this recursive call, the rows TR1 and TR2 being the child elements of TABLE 12 are checked in steps S13 through S19. This time, only the row TR2 overlaps the list item LI1 as the selected object Y, and thus, in step S16, the row TR2 is added to the selection switching view as a selection candidate, and the number of objects is further incremented by 1 to be 4. The row TR2 differs from the list item LI1 (NO in S17), and it has data cells TD3 and TD4 as its child elements (YES in S18), and thus, in step S19, the subroutine in FIG. 7 is called recursively with the row TR2 as the input object.

Checked this time are the data cells TD3 and TD4 being the child elements of the row TR2, and the data cell TD4 alone overlaps the list item LI1, and thus, in step S16 in this recursive call, the data cell TD4 is added to the selection switching view as a selection candidate, and the number of objects in the selection switching view is incremented by 1 to be 5. Here, although the data cell TD4 differs from the list item LI1 (NO in S17), both of the data cells TD3 and TD4 do not have any child element (NO in S18), and thus, the recursive call is terminated. Further, since every child element of BODY 10 has been checked, the process returns to step S4 in the main flow. At this time, since BODY 10 being the parent object X is the root object (YES in S4), the main flow is terminated at this time point. The selection switching view as shown in FIG. 5 is stored in the storage portion 48, and the display control portion 46 reads it from the storage portion 48 for visual display in the form of the tabs near the selected object, i.e. the list item LI1, on the display screen.

Figure 8:
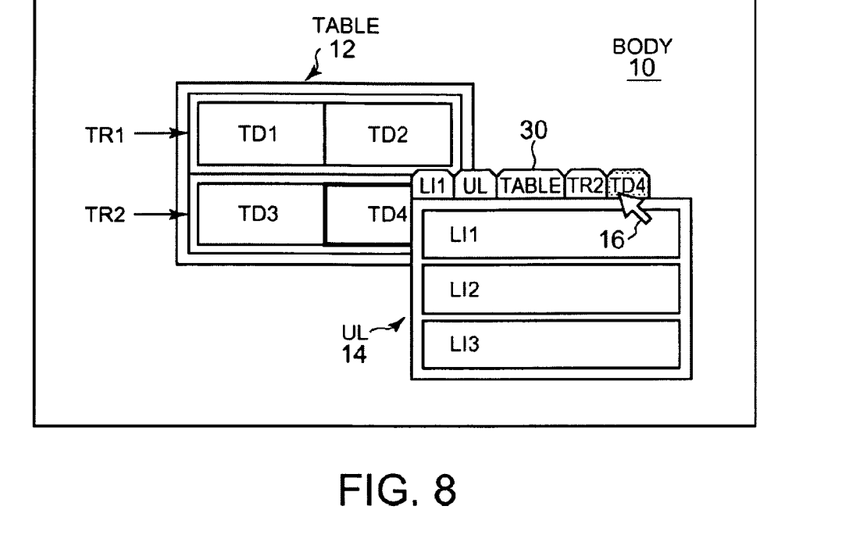
FIG. 8 shows an example of a screen when a user selects a specific tab on the display screen shown in FIG. 3.
Figure 9:
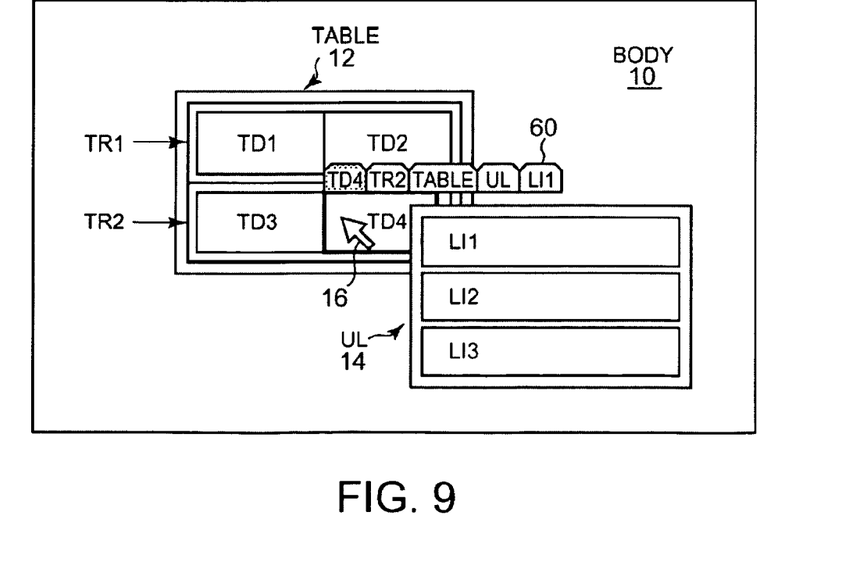
FIG. 9 shows an example of the screen when a user selects a new object on the display screen shown in FIG. 8.

In the example of the display screen shown in FIG. 3, the selection switching view 30 includes five tabs in total, and the user may click on any of them to select a desired object. For example, as shown in FIG. 8, when the user moves the cursor 16 to the tab "TD4" and clicks thereon, the display control portion 46 responsively highlights the clicked tab and the corresponding object (data cell TD4 in this case), to inform the user that selection has been switched to the specific object. In this state, for example when the user moves the cursor 16 to the data cell TD4 and clicks thereon, as shown in FIG. 9, the flows in FIGS. 6 and 7 are repeated with the data cell TD4 as a new selected object, and as a result, a new selection switching view 60 is visually displayed near the data cell TD4. The selection candidates for this selection switching view 60 are extracted in a similar manner as in the case of the selection switching view 30, and thus, detailed description thereof will not be repeated here.

Alternatively, it may be configured such that, when the user clicks on the tab "TD4" in FIG. 8, the selection candidate extracting processing shown in FIGS. 6 and 7 may be repeated with the corresponding object (data cell TD4) as a new selected object Y, and the selection switching view 30 may be rewritten with the names of the selection candidates extracted at that time.

As described above, according to the flowcharts shown in FIGS. 6 and 7, it is possible to check the overlapping of the specific object selected in response to the user input, i.e. the selected object (list item LI1 in the above example), with all the objects (including the selected object itself) displayed on the screen, until the number of selection candidates reaches a predetermined number.

Figure 10:
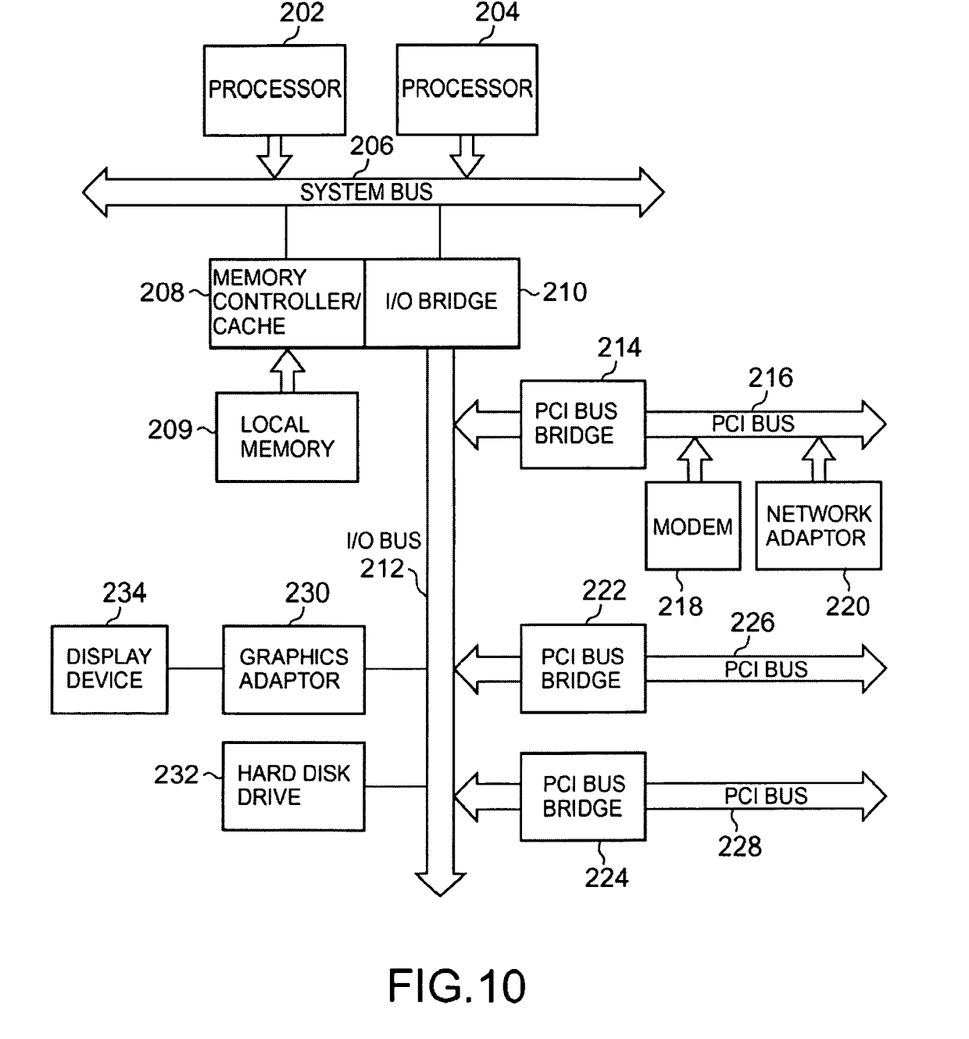
FIG. 10 is a block diagram showing an example of the configuration of a data processing system that can implement the selection switching view generating apparatus shown in FIG. 4.

FIG. 10 shows a configuration example of a data processing system capable of implementing the selection switching view generating apparatus shown in FIG. 4. The data processing system 200 may be a symmetrical multiprocessor (SMP) provided with a plurality of processors 202 and 204 connected to a system bus 206, or may be a single processor system. A memory controller/cache 208 is also connected to the system bus 206, and provides an interface for a local memory 209. An I/O bus bridge 210 is connected to the system bus 206, and provides an interface for an I/O bus 212.

The memory controller/cache 208 and the I/O bus bridge 210 may be integrated as shown in FIG. 10.

A PCI bus bridge 214 connected to the I/O bus 212 provides an interface for a PCI local bus 216. A modem 218, a network adaptor 220 and other communication devices, as well as other peripheral devices may be connected to the PCI local bus. In a typical implementation, the PCI bus is provided with four PCI extension slots or extension connectors.

Additional PCI bus bridges 222 and 224 provide interfaces for additional PCI local buses 226 and 228, respectively, for accepting additional peripheral devices. As shown in FIG. 10, a memory mapped graphics adaptor 230 and a hard disk drive 232 may also be connected to the I/O local bus 212. A display device 234 such as a liquid crystal display is connected to the graphics adaptor 230.

An operating system runs on the processors 202 and 204 to control various components in the data processing system 200 in FIG. 10. The operating system may be a commercially available one such as Windows® XP available from Microsoft® Corporation. The program according to the present invention, running on the operating system, is stored in a storage device such as the hard disk drive 232, and is loaded to the memory 209 and executed to cause the data processing system 200 to function as the object selecting portion 42, the selection candidate extracting portion 44 and the display control portion 46. The storage portion 48 may be implemented by the local memory 209.

Those skilled in the art will sufficiently understand that the hardware shown in FIG. 10 may be modified according to the implementation. A flash ROM (or an equivalent non-volatile memory), an optical disk drive, and other internal hardware or peripheral device may be used in addition to or in place of the hardware shown in FIG. 10.

While the present invention has been explained in the context of a fully functioning data processing system, those skilled in the art will appreciate that the processes of the present invention are capable of being distributed in the form of a computer readable medium of instructions as well as in various forms, and that the present invention applies equally regardless of the specific type of signal bearing media actually used to carry out the distribution. Examples of the computer readable media include recordable type media such as a flexible disk, hard disk drive, RAM, CD-ROM, and DVD-ROM. The computer readable media may take the form of coded formats that are decoded for actual use in a specific data processing system.

The foregoing description of the present invention has been presented for purposes of illustration and description, and is not intended to be exhaustive or limited to the invention in the form disclosed. Many modifications and variations will be apparent to those skilled in the art. The embodiment has been selected and described in order to best explain the principles of the present invention and the practical application, and to enable those skilled in the art to understand the present invention for various embodiments with various modifications as are suited to the particular use contemplated.

What is claimed is:

1. A method for facilitating selection of an object on a display screen of a computer, comprising the steps of:
    the computer selecting a specific object on the display screen in response to a user input;
    the computer extracting any of a plurality of objects displayed on the display screen that overlaps the selected specific object as a selection candidate by following a tree structure of the objects; and
    the computer displaying a selection switching view including an element representing the selection candidate in the vicinity of the selected specific object;
    wherein in response to the user selecting a specific element included in the selection switching view, said extracting step is repeated with an object corresponding to the specific element as a new specific object, to rewrite the contents of the selection switching view with the element representing the selection candidate newly extracted through the repetition of the step.

2. A method for facilitating selection of an object on a display screen of a computer, comprising the steps of:
    the computer selecting a specific object on the display screen in response to a user input;
    the computer extracting any of a plurality of objects displayed on the display screen that overlaps the selected specific object as a selection candidate by following a tree structure of the objects; and
    the computer displaying a selection switching view including an element representing the selection candidate in the vicinity of the selected specific object;
    wherein said extracting step includes the steps of:
        searching for a parent object of the selected specific object;
        for each child object of the parent object, determining whether the child object overlaps the selected specific object;
        adding an element representing the child object determined to overlap in said determining step to the selection switching view;
        for a parent object of the parent object, repeating said searching step, said determining step and said adding step until the parent object is no longer found; and
        terminating said extracting step when the number of elements added to the selection switching view reaches a predetermined number.

3. The method according to claim 2, wherein the child object determined to overlap in said determining step includes the selected specific object.

4. An apparatus for facilitating selection of an object on a display screen, comprising:
    an object selecting portion configured to select a specific object on the display screen in response to a user input;
    a selection candidate extracting portion configured to extract any of a plurality of objects displayed on the display screen that overlaps the selected specific object as a selection candidate by following a tree structure of the objects; and
    a display control portion configured to display a selection switching view including an element representing the selection candidate in the vicinity of the selected specific object;
    wherein until the number of elements added to the selection switching view reaches a predetermined number, the selection candidate extracting portion
        searches for a parent object of the specific object selected by the object selecting portion,
        for each child object of the parent object, determines whether the object overlaps the selected specific object,
        adds an element representing the child object determined to overlap by said determination to the selection switching view, and
        for a parent object of the parent object, repeats said searching, said determination and said adding until the parent object is no longer found.

5. A computer program product embodied in a computer readable storage medium for facilitating selection of an object on a display screen, the computer program product comprising the programming instructions for:
- selecting a specific object on the display screen in response to a user input by an object selecting portion;
- extracting any of a plurality of objects displayed on the display screen that overlaps the selected specific object as a selection candidate by following a tree structure of the objects by a selecting candidate extracting portion; and
- displaying a selection switching view including an element representing the selection candidate in the vicinity of the selected specific object by a display control portion;
- wherein until the number of elements added to the selection switching view reaches a predetermined number, the selection candidate extracting portion
  - searches for a parent object of the specific object selected by the object selecting portion,
  - for each child object of the parent object, determines whether the object overlaps the selected specific object,
  - adds an element representing the child object determined to overlap by said determination to the selection switching view, and
  - for a parent object of the parent object, repeats said searching, said determination and said adding until the parent object is no longer found.

* * * * *